United States Patent
Min et al.

(10) Patent No.: US 8,325,108 B2
(45) Date of Patent: Dec. 4, 2012

(54) SYSTEM FOR CONTROLLING BRIGHTNESS FLICKER OF PARALLAX BARRIER LCD THAT HAS WIDE VIEWING ANGLE AND METHOD THEREOF

(75) Inventors: Kwan-Sik Min, Chungcheongnam-do (KR); Sang Hyun Park, Seoul (KR); Soon Bum Kwon, Chungcheongnam-do (KR); Hyonam Joo, Chungcheongnam-do (KR); Dong Cheol Jeong, Chungcheongnam-do (KR); Tai Hoon Cho, Gyeonggi-do (KR)

(73) Assignee: NDIS Corporation (KR)

( * ) Notice: Subject to any disclaimer, the term of this patent is extended or adjusted under 35 U.S.C. 154(b) by 334 days.

(21) Appl. No.: 12/829,868

(22) Filed: Jul. 2, 2010

(65) Prior Publication Data
US 2011/0006979 A1 Jan. 13, 2011

(30) Foreign Application Priority Data
Jul. 10, 2009 (KR) .................. 10-2009-0063087

(51) Int. Cl.
*G09G 5/00* (2006.01)

(52) U.S. Cl. .............. 345/7; 345/6; 348/42; 348/51; 359/462; 349/15

(58) Field of Classification Search .......... 345/5–9, 345/32, 102, 156; 348/42, 51–59; 359/462, 359/466, 467; 349/11, 15
See application file for complete search history.

(56) References Cited

U.S. PATENT DOCUMENTS

| | | | | |
|---|---|---|---|---|
| 4,847,603 A * | 7/1989 | Blanchard | ................. | 345/7 |
| 5,671,007 A * | 9/1997 | Songer | ................. | 348/49 |
| 5,907,364 A * | 5/1999 | Furuhata et al. | ................. | 348/459 |
| 6,108,029 A | 8/2000 | Lo | | |
| 6,307,589 B1 * | 10/2001 | Maquire, Jr. | ................. | 348/333.03 |
| 6,377,295 B1 * | 4/2002 | Woodgate et al. | ................. | 348/59 |
| 6,727,866 B2 * | 4/2004 | Wang et al. | ................. | 345/7 |
| 6,778,150 B1 * | 8/2004 | Maguire, Jr. | ................. | 345/7 |
| 6,953,249 B1 * | 10/2005 | Maguire, Jr. | ................. | 353/30 |
| 7,688,509 B2 * | 3/2010 | Vissenberg et al. | ................. | 359/463 |
| 7,864,419 B2 * | 1/2011 | Cossairt et al. | ................. | 359/446 |
| 8,013,944 B2 * | 9/2011 | Roosendaal et al. | ................. | 349/15 |
| 2003/0025995 A1 * | 2/2003 | Redert et al. | ................. | 359/464 |
| 2003/0076423 A1 * | 4/2003 | Dolgoff | ................. | 348/222.1 |
| 2003/0118183 A1 * | 6/2003 | Struyk | ................. | 380/213 |
| 2003/0169213 A1 * | 9/2003 | Spero | ................. | 345/7 |
| 2008/0258997 A1 * | 10/2008 | Arai | ................. | 345/6 |
| 2009/0085912 A1 * | 4/2009 | Scott | ................. | 345/419 |
| 2010/0002295 A1 * | 1/2010 | Kimpe | ................. | 359/465 |

FOREIGN PATENT DOCUMENTS

| | | |
|---|---|---|
| KR | 1020060096844 | 9/2006 |
| KR | 1020070023849 | 3/2007 |
| KR | 100765131 | 10/2007 |
| KR | 1020080056592 | 6/2008 |

* cited by examiner

*Primary Examiner* — Joe H Cheng
(74) *Attorney, Agent, or Firm* — Schwegman Lundberg & Woessner, P.A.

(57) ABSTRACT

A system for controlling brightness flicker of a parallax barrier LCD having a wide viewing angle capable of minimizing brightness flicker by adjusting a permittivity curve depending on different times into a predetermined waveform when split barriers are on/off by movement of a viewer's viewing angle, and a method thereof. A method of controlling brightness flicker of a parallax barrier LCD having a wide viewing angle for controlling brightness of a display providing a stereoscopic image by acquiring a real-time image of a viewer, recognizing an image of the viewer and extracting locations and coordinates of eyes of the viewer, and controlling turn-on/off of split barrier electrodes.

12 Claims, 18 Drawing Sheets

| Voltage | T (Deviation) |
|---|---|
| 3.5V | 6.1% |
| 4.0V | 2.2% |
| 4.2V | 1.4% |
| 4.3V | 1.5% |
| 4.5V | 2.1% |
| 4.7V | 2.7% |
| 5.0V | 4.0% |

FIG. 15

| | Improvement method | |
|---|---|---|
| Driving voltage | ▯▯▯ --- aV | Initial state |
| | ▯▯▯ --- aV / bV | Intermediate step 1 |
| | ▯▯▯ --- aV / bV | Intermediate step 2 |
| | ▯▯▯ --- aV | Movement completion step |
| Movement of split electrodes | ▯▯▯▯▯▯ | Initial state |
| | ▯▯▯▯▯▯ | Intermediate step 1 |
| | ▯▯▯▯▯▯ | Intermediate step 2 |
| | ▯▯▯▯▯▯ X1 X2 X3 X4 X5 X6 | Movement completion step |

SYSTEM FOR CONTROLLING BRIGHTNESS FLICKER OF PARALLAX BARRIER LCD THAT HAS WIDE VIEWING ANGLE AND METHOD THEREOF

CROSS-REFERENCE TO RELATED APPLICATION

This application claims priority to and the benefit of Korean Patent Application No. 10-2009-0063087 filed in the Korean Intellectual Property Office on Jul. 10, 2009, the entire contents of which are incorporated herein by reference.

BACKGROUND OF THE INVENTION (a) Field of the Invention

The present invention relates to a parallax barrier LCD, and more particularly, to a system for controlling brightness flicker of a parallax barrier LCD having a wide viewing angle that is capable of minimizing the brightness flicker by adjusting a permittivity curve depending on different times into a predetermined waveform when split barriers are on/off by movement of a viewer's viewing angle, and a method thereof.

(b) Description of the Related Art

Various methods for a technology relating to a stereoscopic display using binocular disparity are being proposed. One of representative methods allows a viewer to acquire a cubic effect by installing a lenticular lens or a parallax barrier spaced by a predetermine distance on a 2D image panel to cause different image information to be transmitted to a viewer's left and right eyes.

In the stereoscopic display technology using the lenticular lens, left and right images are arranged on a focus surface of a lens called a semi-cylindrical lenticular screen in a stripe pattern, and the left and right images are split depending on the directionality of a lens plate through the lens to allow the viewer to view a stereoscopic image without glasses.

The width of one lens is determined by a pixel width of a display device. Two pixels respectively corresponding to the left and right eyes are provided to allow a pixel at the left side of the lens to be viewed by only a right eye and a pixel at the right side of the lens to be viewed by only a left eye, thereby splitting the left and right images.

In the stereoscopic display technology using the parallax barrier, thin stripe vertical slits for transmitting or shielding light are arranged between a viewer's eye and an image at a regular interval and left and right images are alternately disposed at the front or back of the slits by an appropriate interval, and as a result, the left and right images are optically split when the image is viewed through the slit at a predetermined location, causing the viewer to acquire the cubic effect. That is, a stripe parallax barrier optical plate serving as special glasses is installed in front of a monitor screen to allow the viewer to recognize the stereoscopic image without wearing the glasses.

As such, the stereoscopic display technology adopts the method using the binocular disparity.

FIG. 1 is a diagram showing a concept of a known stereoscopic display, which is disclosed in U.S. Pat. No. 6,108,029.

As shown in the figure, the stereoscopic display is configured by installing a parallax barrier 12 in the rear of an image display panel 11 by a predetermined distance. In the image display panel 11, a left image L and a right image R are alternately arranged with a pixel pitch P, and in the parallax barrier 12, a transparent part 12a and an opaque part 12b are alternately arranged with a barrier pitch q.

Light emitted from a light source (not shown) passes through the transparent part 12a of the parallax barrier 12 and reaches both eyes RE and LE of a viewer through the image display panel 11. At this time, light that passes through the right image R of the image display panel 11 reaches the right eye RE of the viewer and light that passes though the left image L of the image display panel 11 reaches the left eye LE of the viewer.

The left image L and the right image R of the image display panel 11 are inputted into the left and right eyes RE and LE of the viewer as different 2D image information to allow the viewer to acquire image information having a cubic effect.

In FIG. 1, the parallax barrier 12 is installed in the rear of the image display panel 11, but the image display panel 11 may be installed in the rear of the parallax barrier 12.

If the entire opaque part 12b of the parallax barrier 12 is transparent, the light emitted from the light source evenly passes through the parallax barrier 12 and the image display panel 11 and reach the viewer. Therefore, a 2D planar image is displayed like the known 2D display. That is, the stereoscopic display may display both the planar image and the stereoscopic image by adjusting the opaque part of the parallax barrier 12.

The stereoscopic display needs a condition for the viewer to effectively perceive the cubic effect, and a relationship expression thereof is shown in Equation 1.

$$d(2n+1)P(D+d)/S, q2P(D+d)/D$$

$$d(2n+1)P(D+d)/S, q2P(D+d)/D \qquad \text{(Equation 1)}$$

Herein, n represents a positive integer, S represents a distance between the left and right eyes of the viewer, D represents the shortest distance between the image display panel and the viewer's eye, d represents the shortest distance between the parallax barrier and the image display panel, q represents the barrier pitch of the parallax barrier, and P represents the pixel pitch of the image display panel.

FIG. 2 is diagram showing a parallax barrier applied to a known stereoscopic display.

The parallax barrier applied to the stereoscopic display includes a common electrode 21 of an upper plate or a lower plate, strip electrodes 22 of an opposite plate arranged at a regular interval of a barrier pitch q, and a power supply device 23 adjusting a transparent state and an opaque state by inducing rearrangement of a liquid crystal layer positioned between the common electrode 21 and the strip electrode 22 by supplying power to the common electrode 21 and the strip electrode 22.

When a voltage is applied between the common electrode 21 and the strip electrode 22 or the applied voltage is interrupted in the power supply device 23, a liquid crystal of the corresponding part becomes transparent or opaque to thereby display the stereoscopic or planar image.

FIGS. 3 and 4 are diagrams for describing disadvantages generated in a known stereoscopic display.

As shown in FIG. 3, the stereoscopic display allows the right eye RE of the viewer to view a right image R of an image display panel 31 and the left eye LE of the viewer to view a left image L of the image display panel 31 by actuating a parallax barrier 32. Therefore, the viewer acquires the cubic effect by synthesizing two images viewed to the right eye RE and the left eye LE in the brain of the viewer.

However, as shown in FIG. 4, when a viewing angle of the viewer deviates from a predetermined location, a part of an image is covered by the barrier, and as a result, the stereoscopic image is not implemented. For example, when the viewing angle of the viewer moves from locations of RE and LE to locations of RE' and LE', a part of the image is covered by the parallax barrier 32, and as a result, the parallax barrier 32 should be moved by W in order to maintain a stable stereoscopic image.

However, since the parallax barrier applied to the known stereoscopic display is fixed, a left-right viewing angle of the viewer is within approximately 5 degrees and is very limitative.

As a method for solving the known problem, as disclosed in Korean Unexamined Publication No. 10-2007-0023849, which is the prior art of the applicant, a split barrier scheme in which a barrier electrode for actuating the parallax barrier is split into a plurality of fine electrodes by using a fine pattern technology, and a driven part and a non-driven part are adjusted through appropriate combination driving as the viewing angle of the viewer moves to thereby vary locations of a transparent part and an opaque part of the parallax barrier, has been proposed.

FIG. 5 is a diagram showing movement of a barrier by a change of a viewing angle of a viewer in a stereoscopic display adopting a known split barrier scheme. The barrier is moved by appropriately combining and driving 8 split fine electrodes depending on the viewing angle of the viewer.

As shown in the figure, when the viewing angle of the viewer moves to the right side or the left side, the parallax barrier is moved by actuating the resulting split fine electrodes, thereby providing a stable stereoscopic image of which distortion is not generated at the moved viewing angle of the viewer.

However, in the known stereoscopic display adopting the split barrier scheme, a transmittance curve depending on different times is provided when the split barriers are on/off in order to move the parallax barrier as the viewing angle of the viewer moves, thereby causing brightness flicker.

FIG. 6 is a diagram showing an on/off relationship of split barriers depending on movement of a viewing angle of a viewer in a known stereoscopic display. In order to move the parallax barrier as the viewing angle of the viewer moves to the right side, an on/off operation of a bundle of 6 split barriers is as shown in FIG. 6.

At this time, a split barrier that is turned off and a split barrier that is turned on have different permittivity characteristics, and as a result, the brightness flicker occurs at a region where ON and OFF intersect each other as shown in "A" of FIG. 7.

Further, as shown in FIG. 8, in the known stereoscopic display adopting the split barrier scheme, the brightness flicker occurs due to moire of the viewing angle of the viewer.

As shown in the figure, even though all images viewed by the left eye LE and the right eye RE are implemented as a white image and the split barriers are fixed, due to the moire, the brightness flicker in which light is lightened and darkened occurs when the viewing angle of the viewer moves.

As described above, the brightness flicker that occurs due to the on/off operation of the split barriers or the moire of the viewing angle of the viewer offends the eyes of the viewer at the time when the viewer views the stereoscopic image, and as a result, the viewer can view a comfortable stereoscopic image only by solving the brightness flicker.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for controlling brightness flicker of a parallax barrier LCD having a wide viewing angle, having an advantage of minimizing occurrence of the brightness flicker by adjusting a permittivity curve through controlling a voltage applied to each electrode (cell) of a display panel in order to display an image.

Further, the present invention has been made in an effort to provide a system for controlling brightness flicker of a parallax barrier LCD having a wide viewing angle having another advantage of minimizing occurrence of the brightness flicker by adjusting the permittivity curve through splitting a permittivity curve depending on an "ON" state or a permittivity curve depending on an "OFF" state of the voltage applied to each electrode (cell) of the display panel by time, and applying a voltage waveform of a modulated phase depending on the shape of the split permittivity curve in order to display the image.

In addition, the present invention has been made in an effort to provide a system for controlling brightness flicker of a parallax barrier LCD having a wide viewing angle having yet another advantage of minimizing occurrence of the brightness flicker caused due to moire as the viewer's viewing angle moves by adjusting the brightness of the barrier through separately driving the split barrier electrodes.

Further, the present invention has been made in an effort to provide a system for controlling brightness flicker of a parallax barrier LCD having a wide viewing angle having still another advantage of minimizing occurrence of the brightness flicker caused due to moire by applying a factor value depending on movement velocity of the viewer's viewing angle.

An exemplary embodiment of the present invention provides a system for controlling brightness flicker of a parallax barrier LCD having a wide viewing angle that includes: an image input section installed at a predetermined portion of a display panel to acquire a real-time image of a viewer; a controller recognizing an image of the viewer and extracting locations and coordinates of eyes of a viewer, and controlling all operations of a stereoscopic image display depending on a change of a viewing angle of the viewer; and split barrier electrodes turned on/off depending on the control by the controller to implement a stereoscopic image, wherein the controller removes the brightness flicker by adjusting a permittivity characteristic depending on turn-on of split barriers by applying a predetermined set voltage to the split barrier electrodes.

Another embodiment of the present invention provides a system for controlling brightness flicker of a parallax barrier LCD having a wide viewing angle that includes: an image input section installed at a predetermined portion of a display panel to acquire a real-time image of a viewer; a controller recognizing an image of the viewer and extracting locations and coordinates of eyes of a viewer, and controlling all operations of a stereoscopic image display depending on a change of a viewing angle of the viewer; and split barrier electrodes turned on/off depending on the control by the controller to implement a stereoscopic image, wherein the controller splits and sets one or more curvature points on a permittivity curve by time while turning on/off the split barrier electrodes and supplies a voltage having a modulated phase to each curvature point to remove the brightness flicker.

Yet another embodiment of the present invention provides a system for controlling brightness flicker of a parallax barrier LCD having a wide viewing angle that includes: an image input section installed at a predetermined portion of a display panel to acquire a real-time image of a viewer; a controller recognizing the image of the viewer and extracting locations and coordinates of eyes of the viewer, and controlling all operations of a stereoscopic image display depending on a change of a viewing angle of the viewer; and split barrier electrodes turned on/off depending on the control by the controller to implement a stereoscopic image, wherein the controller controls the split barrier electrodes for each independent electrode while split barriers are moved and supplies one or more different voltages to the independent electrodes to remove the occurrence of the brightness flicker between adjacent electrodes.

Yet another embodiment of the present invention provides a system for controlling brightness flicker of a parallax barrier LCD having a wide viewing angle that includes:

an image input section installed at a predetermined portion of a display panel to acquire a real-time image of a viewer; a controller recognizing the image of the viewer and extracting locations and coordinates of eyes of the viewer, and controlling all operations of a stereoscopic image display depending on a change of a viewing angle of the viewer; and split barrier electrodes turned on/off depending on the control by the controller to implement a stereoscopic image, wherein the control unit controls on/off timings of the split barrier electrodes that are turned on and the split barrier electrodes that are turned off to be different from each other while split barriers are moved to adjust a permittivity characteristic.

Yet another embodiment of the present invention provides a system for controlling brightness flicker of a parallax barrier LCD having a wide viewing angle that includes:

an image input section installed at a predetermined portion of a display panel to acquire a real-time image of a viewer; a controller recognizing the image of the viewer and extracting locations and coordinates of eyes of the viewer, and controlling all operations of a stereoscopic image display depending on a change of a viewing angle of the viewer; and split barrier electrodes turned on/off depending on the control by the controller to implement a stereoscopic image, wherein the controller determines a movement velocity when the change of the viewing angle of the viewer is detected, and controls movement of the split barrier electrodes by applying a set factor value only when the movement velocity is lower than a threshold velocity and does not move the split barrier electrodes when the movement velocity is equal to or higher than the threshold velocity.

Yet another embodiment of the present invention provides a method of controlling brightness flicker of a parallax barrier LCD having a wide viewing angle for controlling brightness of a display providing a stereoscopic image by acquiring a real-time image of a viewer, recognizing the image of the viewer and extracting locations and coordinates of eyes of the viewer, and controlling turn-on/off of split barrier electrodes, including at least one of:

adjusting a permittivity characteristic depending on turn-on of split barriers by applying a predetermined set voltage to the split barrier electrodes;

splitting and setting one or more curvature points on a permittivity curve by time while turning on/off the split barrier electrodes and supplying a voltage having a modulated phase to each curvature point;

controlling the split barrier electrodes for each independent electrode while split barriers are moved and supplying one or more different voltages to the independent electrodes;

controlling on/off timings of the split barrier electrodes that are turned on and the split barrier electrodes that are turned off to be different from each other while split barriers are moved; and controlling movement of the split barrier electrodes by applying a set factor value only when a changing velocity of a viewing angle of the viewer is lower than a threshold velocity and not moving the split barrier electrodes when the changing velocity is equal to or higher than the threshold velocity.

According to an embodiment of the present invention, it is possible to provide a comfortable feel to a viewer who views a stereoscopic image by minimizing brightness flicker that occurs due to movement of a viewer's viewing angle or movement of split barriers in a stereoscopic display adopting a parallax barrier.

BRIEF DESCRIPTION OF THE DRAWINGS

FIG. 15 is a diagram showing control of independent driving of split barriers in a system for controlling brightness flicker of a parallax barrier LCD having a wide viewing angle according to an exemplary embodiment of the present invention;

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention. The drawings and description are to be regarded as illustrative in nature and not restrictive.

Figure 9:
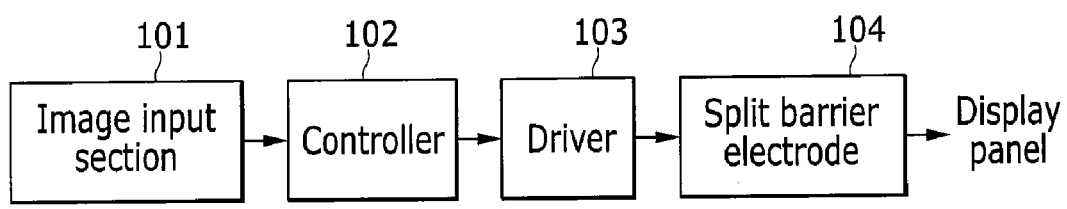
FIG. 9 is a diagram showing a schematic configuration of a system for controlling brightness flicker of a parallax barrier LCD having a wide viewing angle according to an exemplary embodiment of the present invention.

FIG. 9 is a diagram showing a schematic configuration of a system for controlling brightness flicker of a parallax barrier LCD having a wide viewing angle according to an exemplary embodiment of the present invention.

The system according to the exemplary embodiment of the present invention includes an image input section 101, a controller 102, a driver 103, and split barrier electrodes 104.

The image input section 101 is constituted by a camera installed at a predetermined location, preferably at the upper center of a display panel formed of a liquid crystal display device, and acquires a real-time image of a viewer who views a stereoscopic image and applies it to the controller 102.

The controller 102 recognizes and processes the real-time image of the viewer applied from the image input section 101 to extract locations and coordinates of eyes of the viewer and a changed coordinate of a viewing angle by movement of the viewer, thereby controlling movement of split barriers in order to provide a stable stereoscopic image.

The controller 102 applies a predetermined set voltage to the split barrier electrode 104 through the driver 103 as the stereoscopic image is displayed, and adjusts permittivity characteristics of split barriers that are turned on to thereby minimize the brightness flicker.

Further, the controller 102 splits a permittivity curve depending on turn-on or a permittivity curve depending on turn-off by time while the split barrier electrodes 104 are turned on/off through the driver 103 as the stereoscopic image is displayed, and applies an appropriate waveform through phase modulation for each step to thereby prevent the brightness flicker from occurring at the time of the on/off operation depending on movement of the split barriers.

The controller 102 may select and use any one of adjusting the permittivity curve depending on turn-on of the split barrier electrodes 104 and adjusting the permittivity curve depending on turn-off of the split barrier electrode 104 in order to minimize the brightness flicker by applying the phase-modulated waveform, and in addition, the controller 102 may adjust the permittivity curves depending on both turn-on and turn-off.

The controller 102 splits the permittivity curves depending on turn-on and turn-off of the split barrier electrode 104 through the driver 103 by time to generate several curvature points, and applies an appropriate waveform to each of the curvature points through phase modulation.

Further, when the controller 102 detects a change of the viewing angle at the time of analyzing the image of the viewer who views the stereoscopic image, the controller 102 minimizes the brightness flicker through brightness correction by adding one or more intermediate steps and driving fine split barrier electrodes in order to correct brightness that is decreased while changing the split barriers.

Further, when the controller 102 detects the change of the viewing angle at the time of analyzing the image of the viewer who views the stereoscopic image, the controller 102 determines movement velocity and applies a factor depending on the velocity to control the on/off voltage of the split barrier electrodes 104, thereby minimizing the brightness flicker.

Further, the controller 102 controls on/off timings of the split barrier electrodes 104 that are turned on and the split barrier electrodes 104 that are turned off to be different from each other while moving the split barriers by controlling turn on/off of the split barrier electrodes 104 through the driver 103 so as to minimize the brightness flicker.

For example, voltage application timing of the split barrier electrodes 104 that are turned on is normally controlled and voltage elimination timing of the split barrier electrodes 104 that are turned off is controlled to be delayed by a predetermined time, or the voltage application timing of the split barrier electrodes 104 that are turned on is controlled to be earlier than the normal voltage application timing and the voltage elimination timing of the split barrier electrodes 104 that are turned off is normally controlled so as to minimize the brightness flicker through brightness correction.

That is, the split barrier electrodes 104 that are turned on are actuated earlier than the split barrier electrodes 104 that are turned off by a predetermined time.

The driver 103 turns on/off the split barrier electrodes 104 by generating a patternized waveform depending on the control signal applied from the controller 102 to provide the stereoscopic image to the viewer through the display panel.

The split barrier electrodes 104 are turned on/off depending on the waveform applied from the driver 103 to implement the stereoscopic image through the display panel.

In the configuration of the present invention including the above-mentioned functions, an operation to minimize the brightness flicker will be described below.

As a first embodiment, an operation to minimize the brightness flicker by controlling the voltage applied to the split barrier electrodes will be described below.

The display panel formed of the liquid crystal display device maintains a balance state even when a driving voltage is not applied to the electrode (cell), but when the driving voltage is applied to the electrode (cell), alignment of liquid crystals is changed depending on the voltage to display an image by using the resulting change of a polarization state. On the contrary, when the driving voltage applied to each electrode (cell) is eliminated, the display panel is restored to the original balance state.

Figure 10:
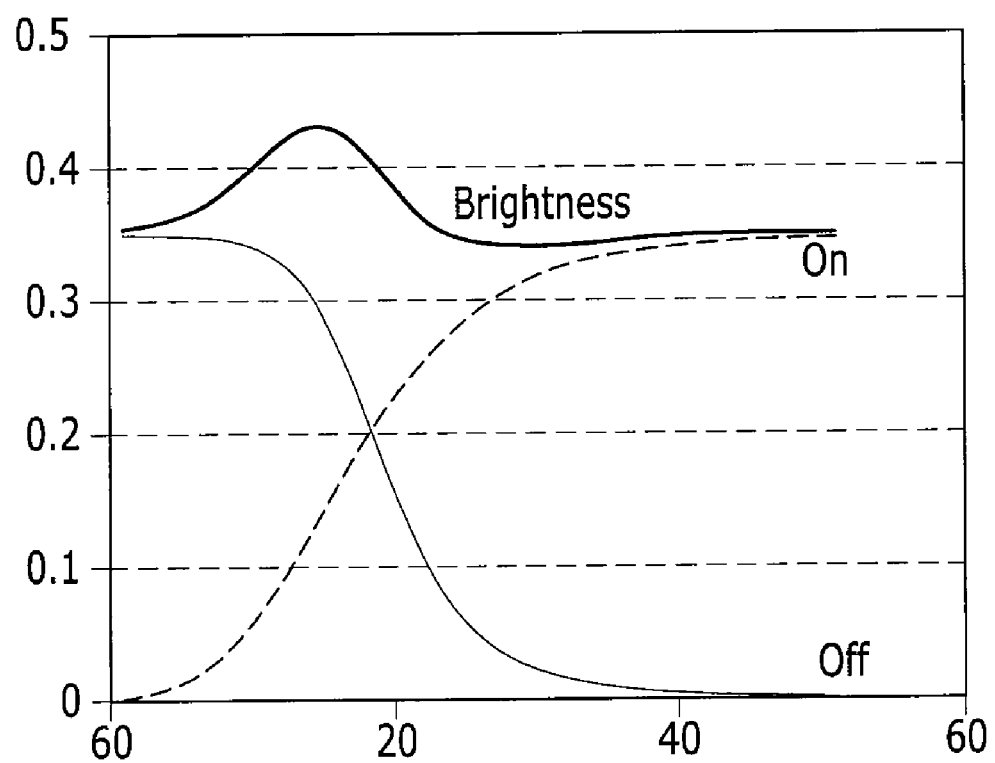
FIGS. 10 and 11 are graphs showing one example of brightness flicker generated depending on an applied voltage in a stereoscopic display.
Figure 11:
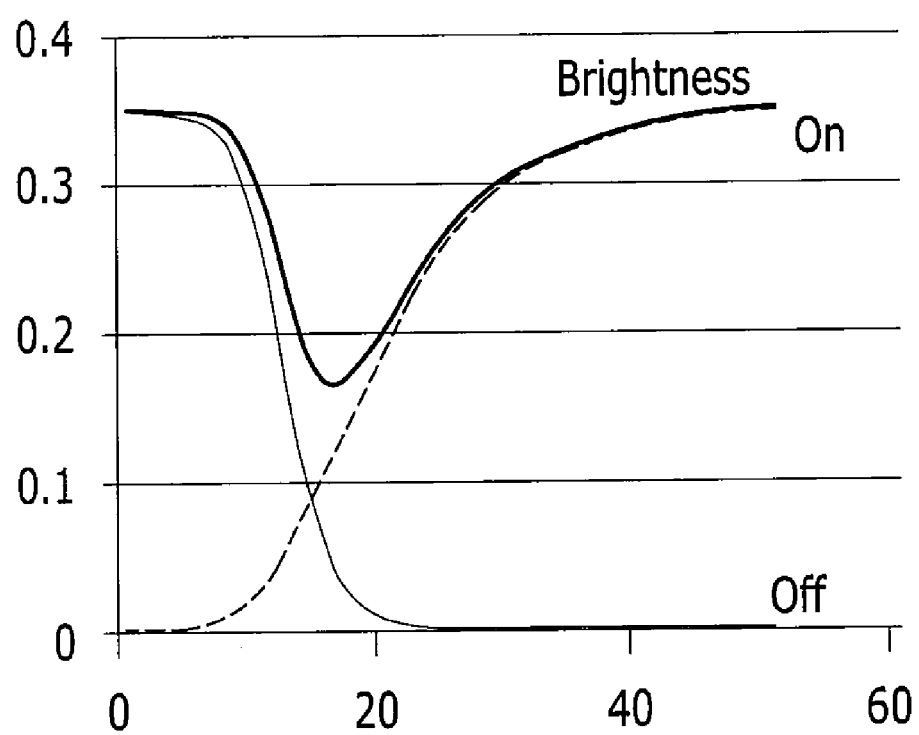
Figure 12:
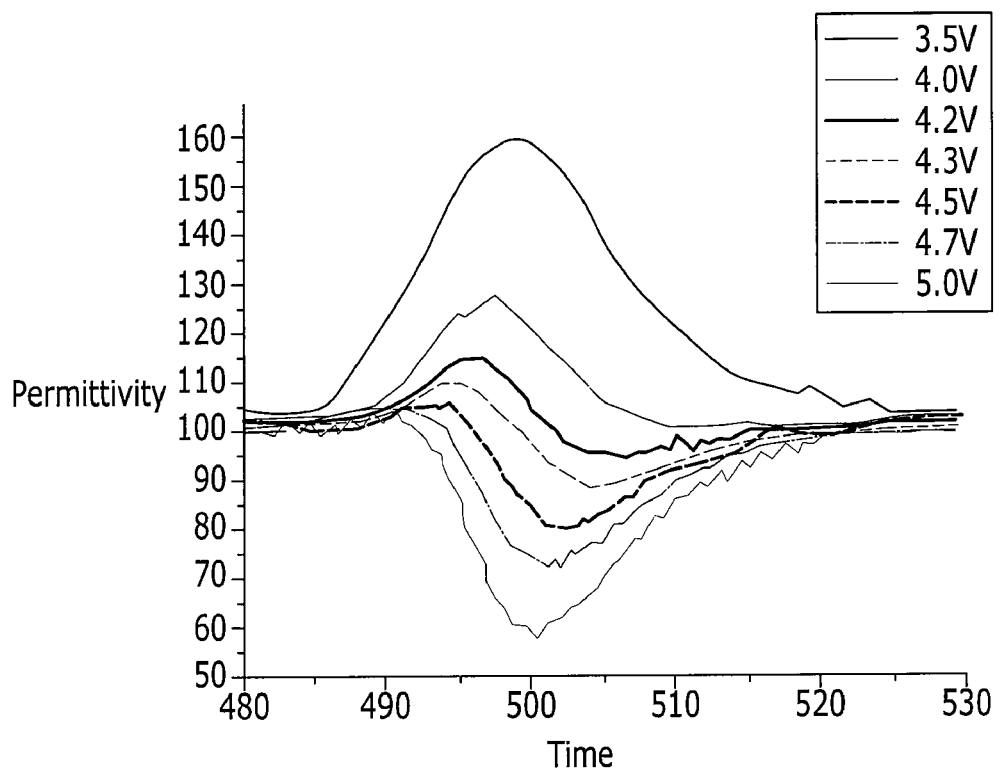
FIG. 12 is a graph showing an example in which brightness flicker depending on each applied voltage supplied to a display panel in a stereoscopic display is studied.

FIGS. 10 and 11 are graphs showing one example in which brightness flicker generated depending on driving voltage in a stereoscopic display is detected, and FIG. 12 as an experimental example of the present invention is a graph showing an example in which brightness flicker depending on each driving voltage in a stereoscopic display is studied.

FIG. 10 shows a result of measuring characteristics of brightness while the split barrier electrodes 104 are turned on/off with a voltage of 3.3V through the driver 103 by the controller 102 in order to display the stereoscopic image. A characteristic in which brightness is increased and then restored to a normal state at a cross point where split barrier electrodes 104 are turned on and off is detected.

FIG. 11 shows a result of measuring characteristics of brightness while the split barrier electrodes 104 are turned on/off with a voltage of 4.0V through the driver 103 by the controller 102 in order to display the stereoscopic image. A characteristic in which brightness is decreased and then restored to the normal state at the cross point where the split barrier electrodes 104 are turned on and off is detected.

FIG. 12 shows data acquired by measuring a change of brightness depending on the voltage applied to the split barrier electrodes by using a 7-inch mini-monitor as one example. Herein, when the split barrier electrodes 104 are turned on/off with a voltage of 3.5V, a permittivity deviation is 6.1%, when the split barrier electrodes 104 are turned on/off with a voltage of 4.0V, the permittivity deviation is 2.2%, when the split barrier electrodes 104 are turned on/off with a voltage of 4.2V, the permittivity deviation is 1.4%, when the split barrier electrodes 104 are turned on/off with a voltage of 4.3V, the permittivity deviation is 1.5%, when the split barrier electrodes 104 are turned on/off with a voltage of 4.5V, the permittivity deviation is 2.1%, when the split barrier electrodes 104 are turned on/off with a voltage of 4.7V, the permittivity deviation is 2.7%, and when the split barrier electrodes 104 are turned on/off with a voltage of 5.0V, the permittivity deviation is 4%.

Therefore, by selecting voltage having the smallest permittivity deviation (variation width) in consideration of the on/off permittivity curve while turning on/off the split barrier electrodes 104 at the time of displaying the stereoscopic image, the voltage is used as the driving voltage.

For example, when the characteristic depending on the voltage is detected as shown in FIG. 12, the permittivity deviation is the smallest at 1.4% in the case in which the split barrier electrode 104 are actuated with the voltage of 4.2V. Therefore, the voltage is determined as a voltage to minimize the brightness flicker.

However, in the case in which an excellent stereoscopic characteristic (dark) cannot be implemented with the voltage of 4.2V, the brightness flicker may be minimized by using an independent driving scheme of the split barrier electrodes 104.

For example, assuming that the voltage to implement the excellent stereoscopic characteristic is 5.0V, the controller 102 first actuates the split barrier electrodes 104 with the voltage of 4.2V showing the smallest permittivity deviation, and thereafter boosts the voltage to the voltage of 5.0V or by steps after the boosting of the voltage through the driver 103 so as to minimize the brightness flicker.

As a second embodiment, an operation to minimize the brightness flicker by modulating a phase of the voltage applied to the split barrier electrodes will be described below.

The controller 102 splits the permittivity curve depending on turn-on of the split barrier electrodes 104 by time while turning on/off the split barrier electrodes 104 by controlling the voltage applied to the split barrier electrodes 104 through the driver 103 in order to display the stereoscopic image, and applies an appropriate waveform by modulating the phase of the voltage applied depending on each of split timings so as to minimize the brightness flicker.

Figure 13:
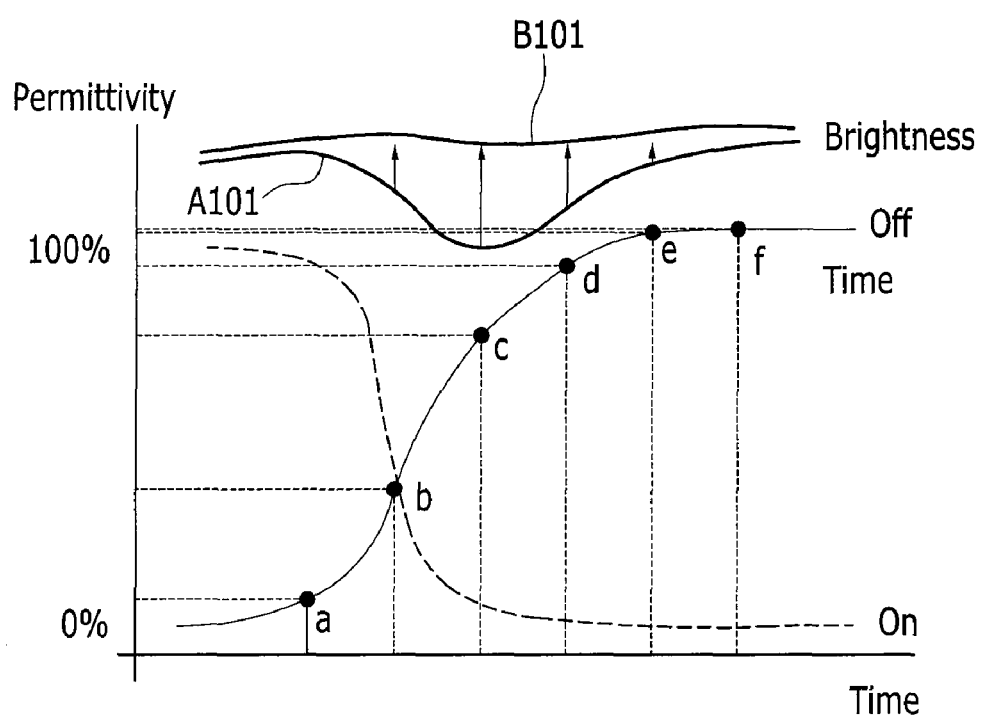
FIG. 13 is a diagram showing improvement of brightness flicker by phase modulation in a system for controlling brightness flicker of a parallax barrier LCD having a wide viewing angle according to an exemplary embodiment of the present invention.
Figure 14:
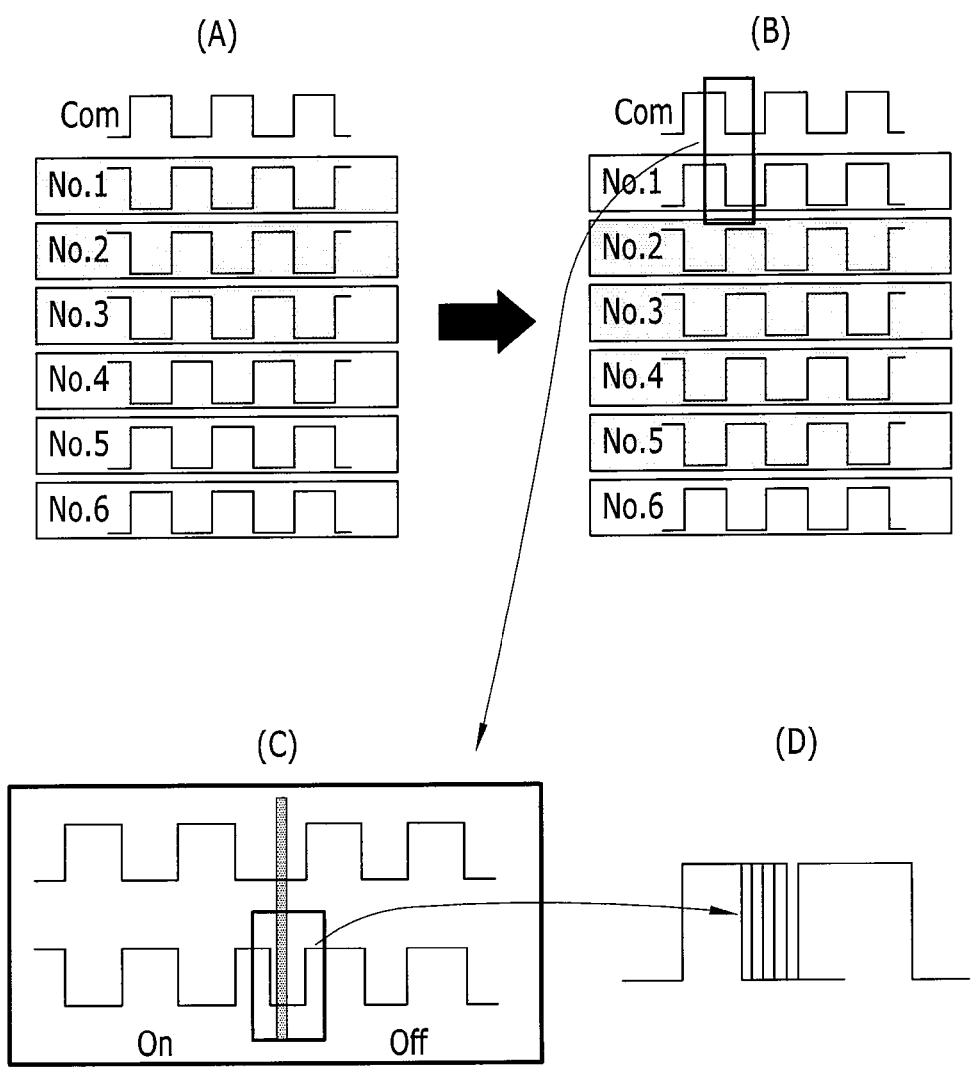
FIG. 14 is a diagram showing a control of phase modulation in a system for controlling brightness flicker of a parallax barrier LCD having a wide viewing angle according to an exemplary embodiment of the present invention.

FIG. 13 is a diagram showing improvement of brightness flicker by phase modulation in a system for controlling brightness flicker of a parallax barrier LCD having a wide viewing angle according to an exemplary embodiment of the present invention, and FIG. 14 is a diagram showing control of phase modulation in a system for controlling brightness flicker of a parallax barrier LCD having a wide viewing angle according to an exemplary embodiment of the present invention.

In FIG. 13, as one example, the controller 102 extracts various curvature points a to f by splitting the permittivity curve depending on turn-off of the split barrier electrodes 104 while controlling the split barrier electrodes 104 through the driver 103 in order to display the stereoscopic image by time, and thereafter applies different waveforms through modulation of the voltage applied at each curvature point.

Extraction of the curvature points in the permittivity curve is determined by a program regardless of the number of curvature points. Assuming that the voltage is driven at a phase of 120 Hz when the number of curvature points a to f is determined to be 6 as shown in FIG. 13, the permittivity curve is split by time of approximately 8.33 msec.

Modulation of the phase of the voltage at each curvature point is determined by using a table showing predetermined permittivity and voltage characteristics.

For example, in the case in which there are 6 split barrier electrodes and the number of barrier bundles is 4, when first to fourth barriers No. 1 to No. 4 that belong to one bundle shown in FIG. 14A are changed to second to fifth barriers No. 2 to No. 5 shown in FIG. 14B in accordance with a barrier movement command Com as shown in FIG. 14, the curvature points that are split by time are provided in the middle as shown in FIG. 14C and a phase-modulated voltage is supplied as shown in FIG. 14D so as to minimize the occurrence of the brightness flicker.

That is, an adjustable curvature point is extracted in the middle of the first barrier No1 that is switched from the "ON" state to the "OFF" state in accordance with the barrier movement command Com and voltages having different phases are applied by modulating the phase of the voltage at each curvature point, thereby implementing the brightness flicker generated like A101 of FIG. 13 to the stable brightness flicker like B101.

A third embodiment shows a method of minimizing brightness flicker caused due to moire depending on a viewing angle.

Figure 1:
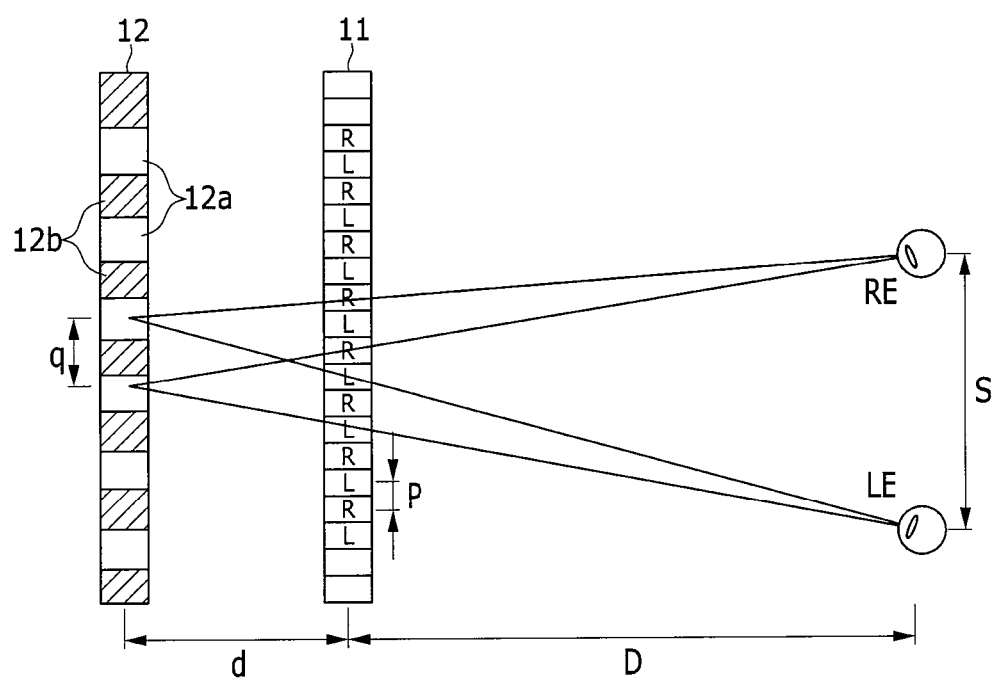
FIG. 1 is a diagram showing a concept of a known stereoscopic display.
Figure 2:
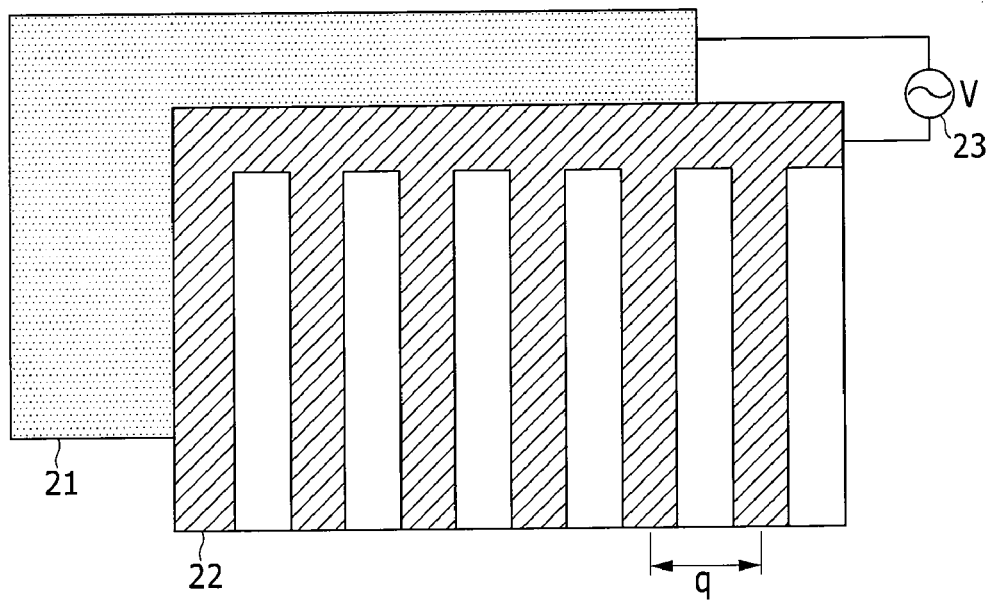
FIG. 2 is diagram showing a parallax barrier applied to a known stereoscopic display.
Figure 3:
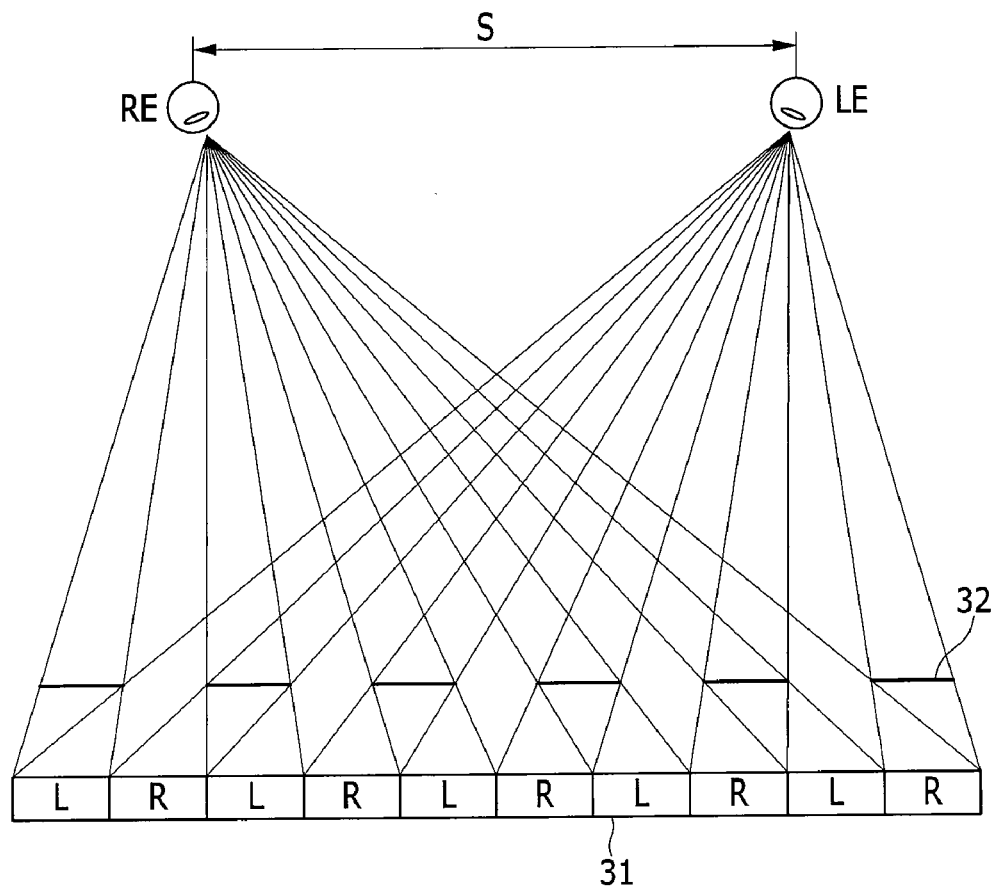
FIGS. 3 and 4 are diagrams for describing disadvantages generated in a known stereoscopic display.
Figure 4:
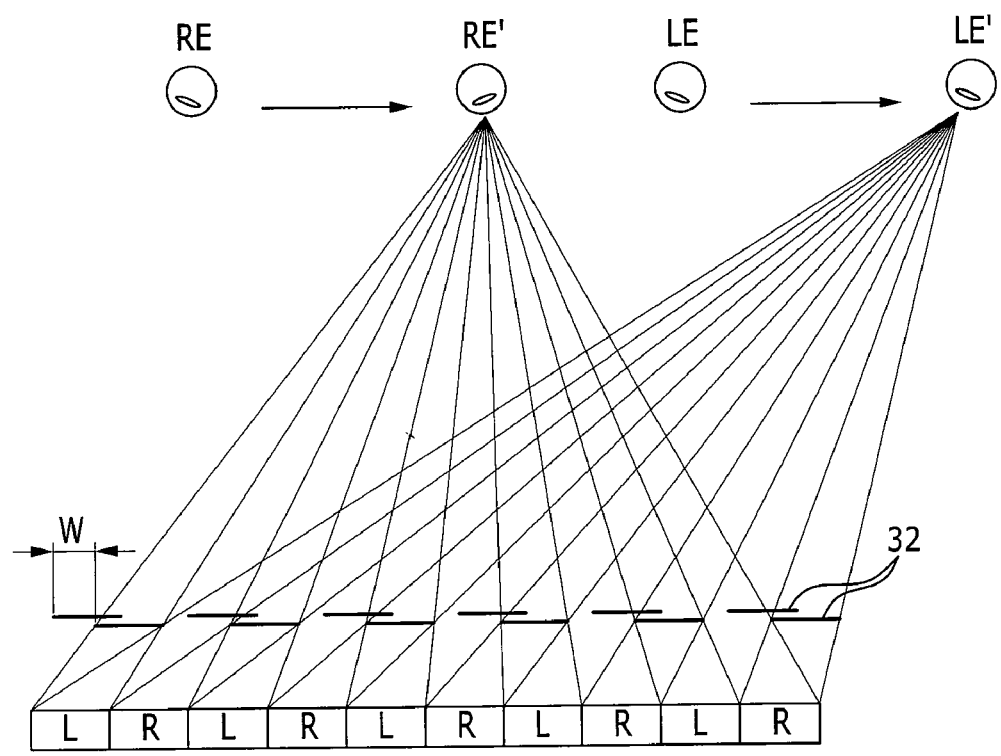
Figure 5:
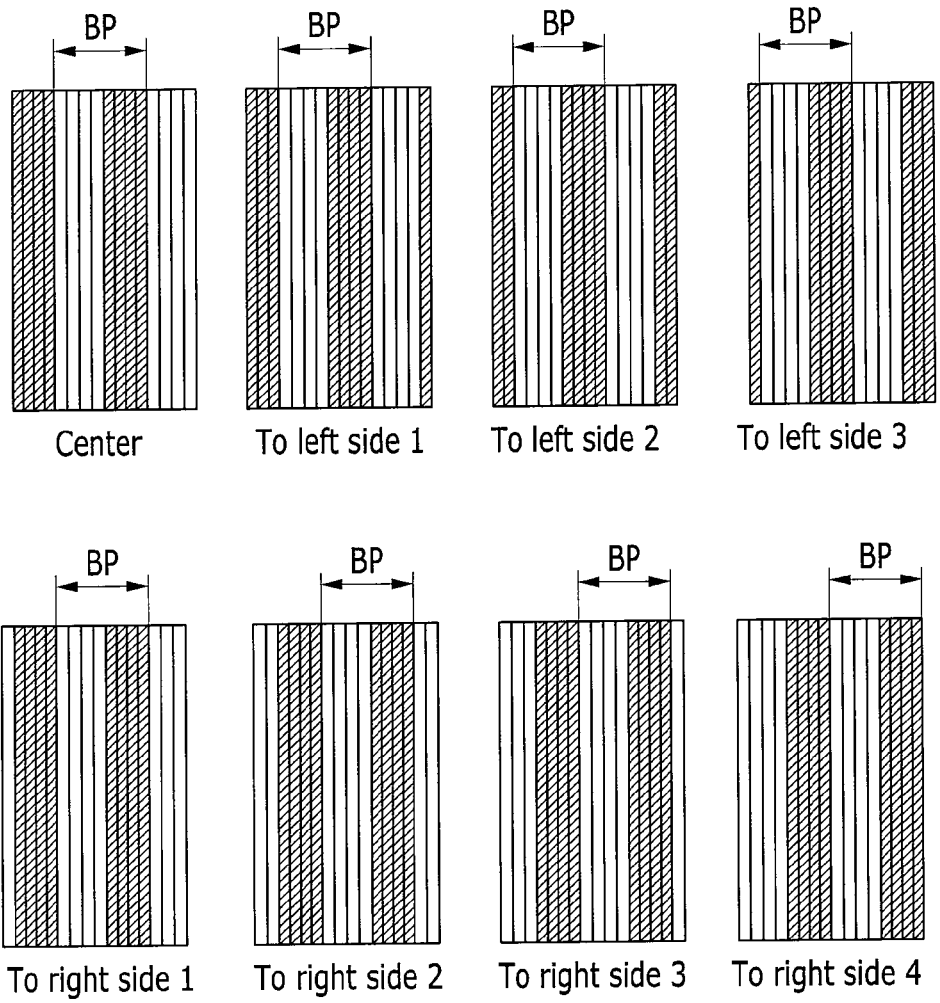
FIG. 5 is a diagram showing movement of a barrier by a change of a viewing angle of a viewer in a known stereoscopic display.
Figure 6:
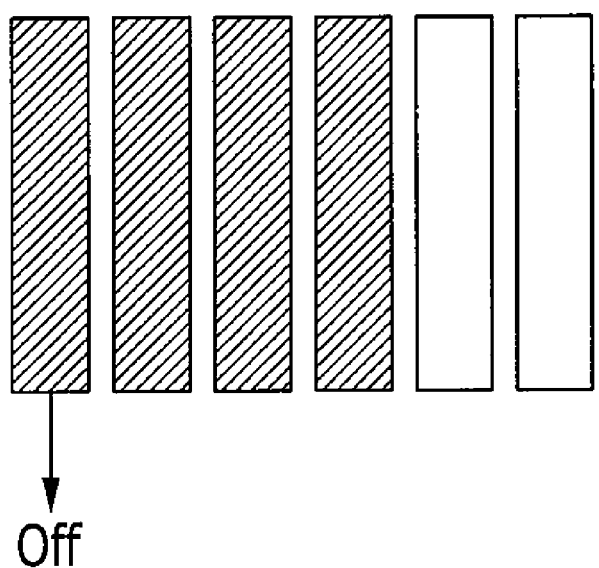
FIG. 6 is a diagram of an on/off relationship of split barriers depending on movement of a viewing angle of a viewer in a known stereoscopic display.
Figure 6:
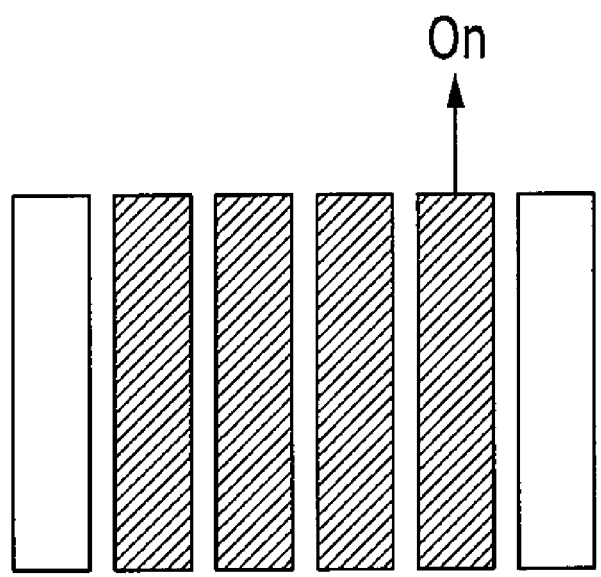
Figure 7:
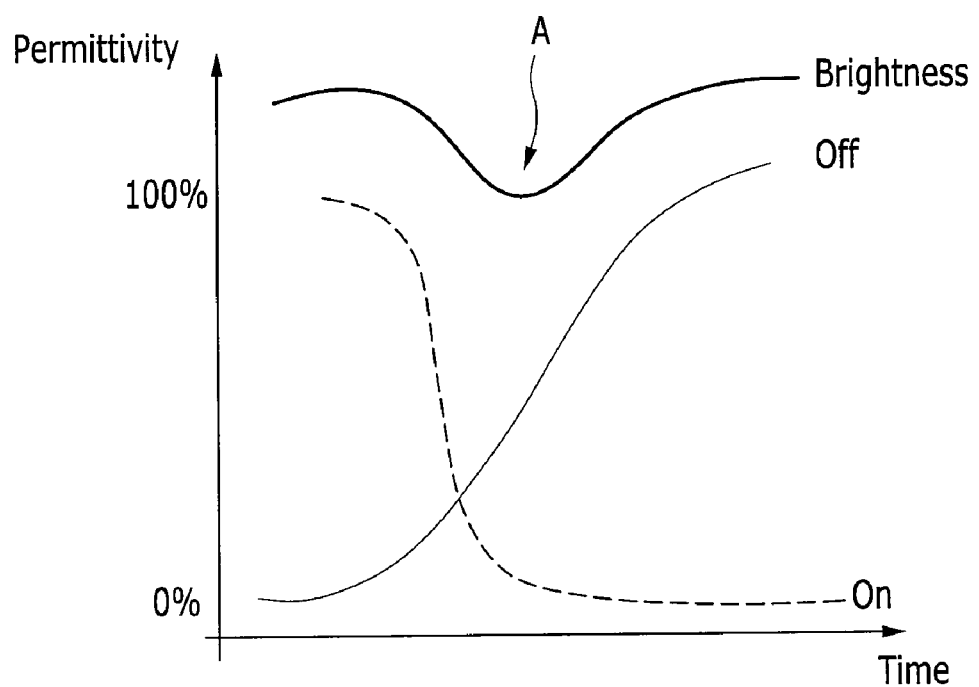
FIG. 7 is a diagram showing brightness flicker generated by movement of a barrier in a known stereoscopic display.
Figure 8:
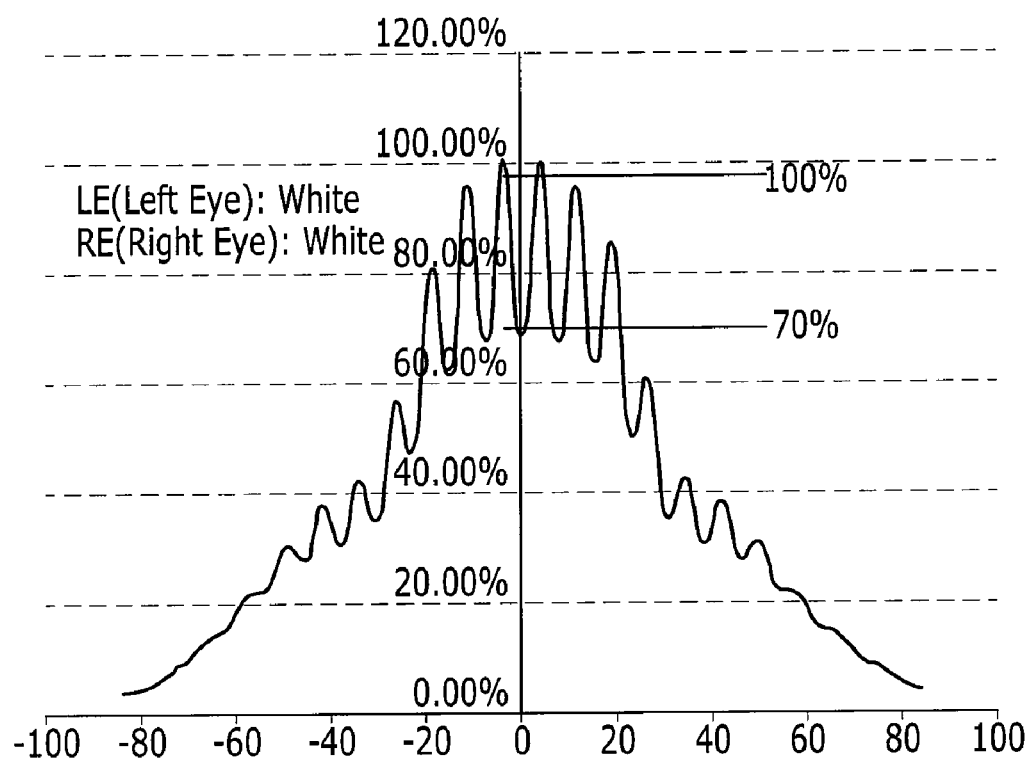
FIG. 8 is a diagram showing a brightness flicker phenomenon caused due to moire of a viewing angle of a viewer in a known stereoscopic display.

In general, the split barriers are not continuously changed but are changed in a stepwise fashion depending on the number of split barriers. However, when the viewing angle of the viewer is changed, the brightness is continuously changed as shown in FIG. 8.

Although the brightness flicker caused due to moire depends on design and characteristics of the display, brightness flicker of approximately 30% is substantially generated depending on the change of the viewing angle. Therefore, in the present invention, the brightness flicker is minimized by controlling independent driving of the split barrier electrodes as shown in FIG. 15.

As shown in FIG. 15, one or more intermediate steps are provided while moving the split barriers to the right side or the left side in order to correct decreased brightness by changing the viewing angle of the viewer, thereby minimizing the brightness flicker.

This will be described in more detail below.

In the display panel constituted by the barrier bundles X1 to X4, when movement of the viewing angle of the viewer is detected through the image input section 101 while the controller 102 controls the split barrier electrodes 104 with a first voltage aV providing a stable stereoscopic characteristic at the time of displaying the stereoscopic image through the driver 103, the split barriers are moved from X1 to X4 to X2 to X5 in order to correct the brightness in accordance with a movement coordinate.

As such, one or more intermediate steps are further included while the split barriers are moved from the split barriers of the bundle of X1 to X4 to the split barriers of the bundle of X2 to X5 so as to prevent a brightness deviation from being generated between adjacent split barriers.

For example, when the split barriers are moved by the change of the viewing angle of the viewer, the control unit 102 enters an intermediate step 1 to supply a second voltage bV having a minimum brightness deviation to the first split barrier electrode X1 that is switched from the "ON" state to the "OFF" state, supply the second voltage bV having the minimum brightness deviation to the fifth split barrier electrode X5 that is switched from the "OFF" state to the "ON" state and the fourth split barrier electrode X4 adjacent to the fifth split barrier electrode X5, and supply the normal voltage aV to the second split barrier electrode X2 and the second split barrier electrode X3.

At this time, the first voltage aV, which provides the stable stereoscopic characteristic, is higher than the second voltage bV, and as a result, the brightness in the display panel when the first voltage aV is supplied is higher than that when the second voltage bV is supplied.

Therefore, in the intermediate step 1 where the "ON" state is switched to the "OFF" state, the brightness deviation is decreased between the first split barrier electrode X1 and the second split barrier electrode X2 to thereby minimize the brightness flicker, and the brightness deviation is also decreased between the third split barrier electrode X3 and the fourth split barrier electrode X4 to thereby minimize the brightness flicker.

Thereafter, the controller 102 enters an intermediate step 2 to switch the first split barrier electrode X1 from the "ON" state to the "OFF" state by completely interrupting the voltage supplied to the first split barrier electrode X1, supply the second voltage bV to the second split barrier electrode X2, and supply the second voltage bV to the fifth split barrier electrode X5.

In addition, the controller 102 supplies the first voltage aV to the third split barrier electrode X3 and the fourth split barrier electrode X4.

Therefore, at the intermediate step 2, the brightness deviation is decreased between the second split barrier electrode X2 and the third split barrier electrode X3 to thereby minimize the occurrence of the flicker, and the brightness deviation is decreased between the fourth split barrier electrode X4 and the fifth split barrier electrode X5 that is switched from the "OFF" state to the "ON" state to thereby minimize the occurrence of the flicker.

As described above, when execution of the intermediate steps 1 and 2 is complete while the split barriers move, the first voltage aV is supplied to the second split barrier electrode X2 to the fifth barrier electrode X5 that constitute one bundle, thereby achieving display ensuring the stable stereoscopic characteristic in the display panel.

When the intermediate step is constituted by a plurality of steps and as a result the voltage is partitioned, the brightness flicker between the split barrier electrodes is further minimized. Further, the brightness flicker is variable depending on a designer.

As the first voltage aV actuating the split barrier electrodes, a voltage of 5V or more at which the display panel displays sufficient contrast is supplied, as the voltage at the intermediate steps 1 and 2, a voltage of 4.2V at which the brightness deviation is minimized is applied, and when movement of the split barrier electrode is completed, a voltage of 5V having the excellent stereoscopic characteristic is supplied, thereby minimizing the occurrence of the brightness flicker.

As a reference for determining the voltage, a voltage (final voltage) having the excellent stereoscopic characteristic and a voltage (intermediate voltage) having the smallest brightness flicker are selected and applied through repeated tests.

As described above, when the split barriers are moved by actuating the split barriers for each independent electrode at different voltages, the number of split barrier electrodes controlled at the initial step and the intermediate step and the step after the movement is completed may the same or different for each step.

A fourth embodiment shows a method of adopting a correction factor depending on a changing velocity of a viewing angle of a viewer.

Figure 16:
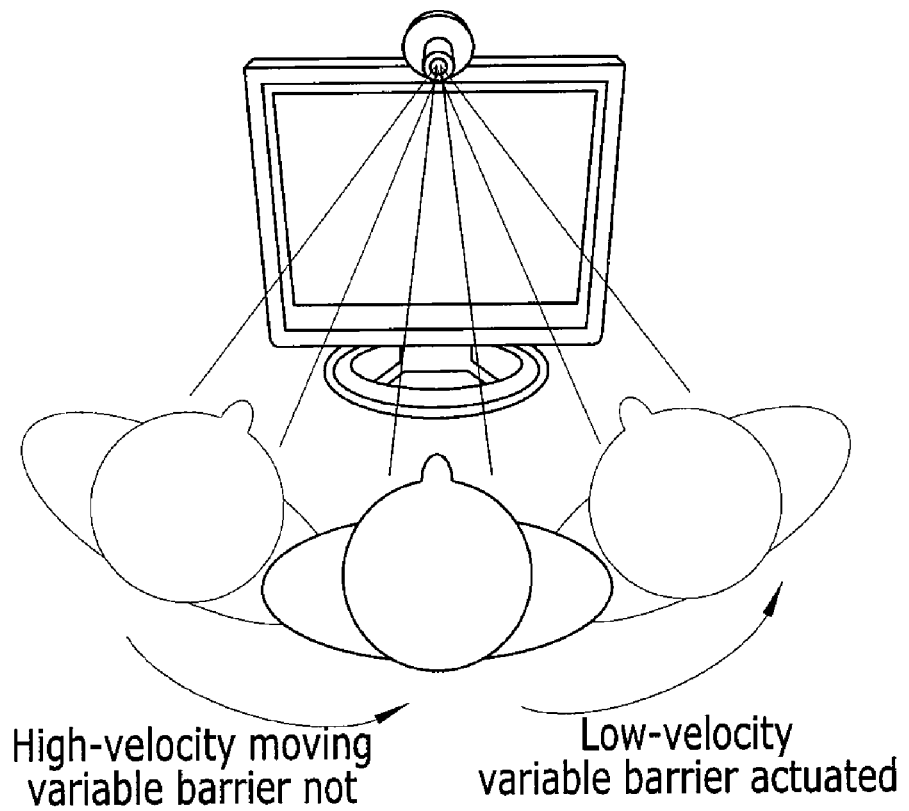
FIG. 16 is a conceptual diagram showing correction adaptation depending on a changing velocity of a viewing angle of a viewer in a system for controlling brightness flicker of a parallax barrier LCD having a wide viewing angle according to an exemplary embodiment of the present invention.

FIG. 16 is a conceptual diagram showing correction adaptation depending on a changing velocity of a viewing angle of a viewer in a system for controlling brightness flicker of a parallax barrier LCD having a wide viewing angle according to an exemplary embodiment of the present invention.

Since a reference velocity of approximately 40 to 60 pixel/sec is applied in the case of 6-splitting in a VGA resolution of the display panel that is the stereoscopic display, when the controller 102 measures the movement velocity of the viewing angle of the viewer and determines that the measured movement velocity is equal to or higher than the set reference velocity at the time of analyzing the image inputted through the image input section 101, it is very difficult to track the movement of the viewing angle through the movement of the split barrier electrode, and thus it is possible to prevent the split barrier electrode from being moved.

However, when the measured movement velocity of the viewing angle of the viewer is lower than the set reference velocity, the controller 102 controls the movement velocity of the viewing angle of the viewer by adjusting the voltage applied to the split barrier electrode 104 by adopting a factor value depending on the movement velocity, thereby minimizing the occurrence of the brightness flicker while the split barrier electrode 104 is moved.

A fifth embodiment shows a method of minimizing brightness flicker by controlling on/off timings of split barrier electrodes to be different from each other.

Figure 17A:
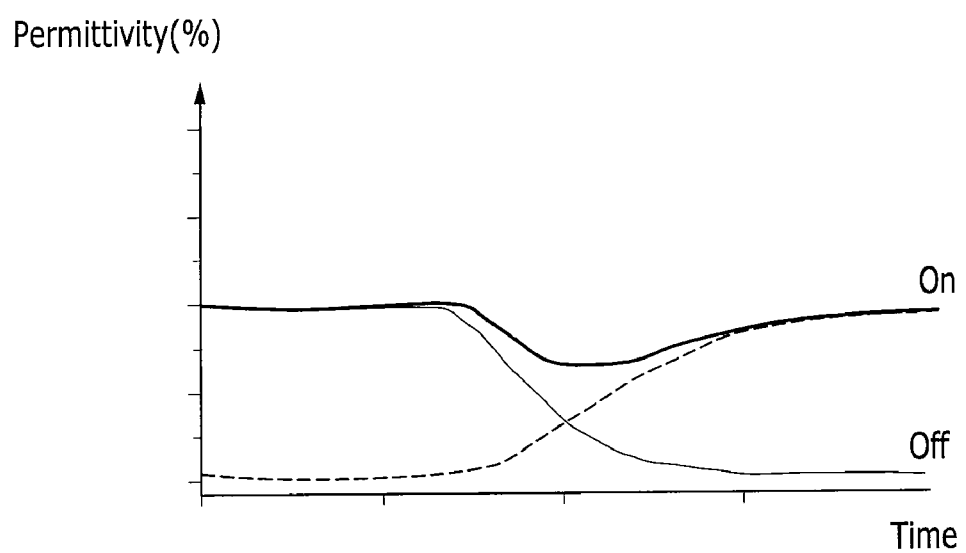
FIG. 17 is a conceptual diagram showing minimization of brightness flicker by controlling on/off timings of split barrier electrodes to be different from each other in a system for controlling brightness flicker of a parallax barrier LCD having a wide viewing angle according to an exemplary embodiment of the present invention.
Figure 17B:
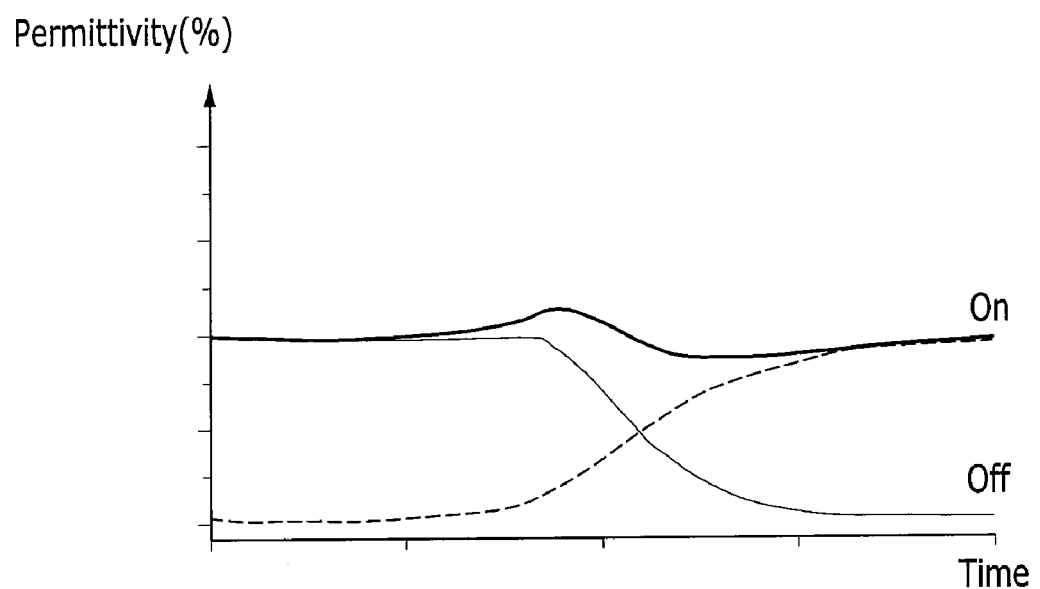

FIGS. 17A and 17B are conceptual diagrams showing minimization of brightness flicker by controlling on/off timings of split barrier electrodes to be different from each other in a system for controlling brightness flicker of a parallax barrier LCD having a wide viewing angle according to an exemplary embodiment of the present invention.

When the split barriers are moved in accordance with the control by the controller 102 while the stereoscopic image is displayed, the split barrier electrodes 104 are turned on and off by the driver 103.

At this time, as shown in FIG. 17A, when the controller 102 controls timing when the voltage is applied to the split barrier electrode 104 that is turned on and timing when the voltage applied to the split barrier electrode 104 that is turned off is eliminated to be the same, predetermined brightness flicker occurs.

According to an observation result through a test, when turn-on/off of the split barrier electrode 104 that is turned on and the split barrier electrode 104 that is turned off are controlled at the same time, occurrence of brightness flicker of approximately 3.6% is detected.

Accordingly, by the method of minimizing the brightness flicker depending on turn on/off of the split barrier electrode while moving the split barriers, the timing when the voltage is applied to the split barrier electrode 104 that is turned on is normally controlled and the timing when the voltage applied to the split barrier electrode 104 that is turned off is eliminated is controlled to be delayed for a predetermined time to compensate brightness between adjacent split barrier electrodes, thereby minimizing the occurrence of the brightness flicker.

Alternatively, in an opposite case, the timing when the voltage is applied to the split barrier electrode 104 that is turned on is controlled to be earlier than the normal timing by a predetermined time and the timing when the voltage is applied to the split barrier electrode 104 that is turned off is normally controlled to compensate the brightness between the adjacent split barrier electrodes, thereby minimizing the occurrence of the brightness flicker.

That is, as shown in FIG. 17B, the voltage is applied to the split barrier electrode 104 that is turned on to be turned on at a time t1 and the voltage applied to the split barrier electrode 104 that is turned off is eliminated at a time t2 to thereby minimize the brightness flicker.

As such, the "ON" operation is executed faster than the "OFF" operation by a predetermined set time while the split barrier electrode 104 is controlled to be turned on/off.

For example, when the "ON" operation is executed faster than the "OFF" operation by 3.75 ms at the time of turning on/off the split barrier electrode 104 with the voltage of 5V, a phenomenon in which the brightness flicker is decreased to 1.7% is detected through the test.

The above-mentioned exemplary embodiment of the present invention is not implemented by only the device and method, but may be implemented by a program that can realize functions corresponding to components of the exemplary embodiment of the present invention or a recording medium in which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling brightness flicker of a parallax barrier LCD having a wide viewing angle, comprising:
    an image input section installed at a predetermined portion of a display panel to acquire a real-time image of a viewer;
    a controller recognizing an image of the viewer and extracting locations and coordinates of eyes of a viewer, and controlling all operations of a stereoscopic image display depending on a change of a viewing angle of the viewer; and
    split barrier electrodes turned on/off depending on the control by the controller to implement a stereoscopic image,
    wherein the controller removes the brightness flicker by adjusting a permittivity characteristic depending on turn-on of split barriers by applying a predetermined set voltage to the split barrier electrodes.

2. A system for controlling brightness flicker of a parallax barrier LCD having a wide viewing angle, comprising:
    an image input section installed at a predetermined portion of a display panel to acquire a real-time image of a viewer;
    a controller recognizing an image of the viewer and extracting locations and coordinates of eyes of a viewer, and controlling all operations of a stereoscopic image display depending on a change of a viewing angle of the viewer; and
    split barrier electrodes turned on/off depending on the control by the controller to implement a stereoscopic image,
    wherein the controller splits and sets one or more curvature points on a permittivity curve by time while turning on/off the split barrier electrodes and supplies a voltage having a modulated phase to each curvature point to remove the brightness flicker.

3. The system of claim 2, wherein
the controller removes the brightness flicker by applying a setting of the curvature points to any one of a permittivity curve depending on turn-on of the split barrier electrodes and a permittivity curve depending on turn-off of the split barrier electrodes.

4. The system of claim 2, wherein
the controller removes the brightness flicker by applying a setting of the curvature points to both a permittivity curve depending on turn-on of the split barrier electrodes and a permittivity curve depending on turn-off of the split barrier electrodes.

5. A system for controlling brightness flicker of a parallax barrier LCD having a wide viewing angle, comprising:
    an image input section installed at a predetermined portion of a display panel to acquire a real-time image of a viewer;
    a controller recognizing the image of the viewer and extracting locations and coordinates of eyes of the viewer, and controlling all operations of a stereoscopic image display depending on a change of a viewing angle of the viewer; and
    split barrier electrodes turned on/off depending on the control by the controller to implement a stereoscopic image,
    wherein the controller controls the split barrier electrodes for each independent electrode while split barriers are moved and supplies one or more different voltages to the independent electrodes to remove the occurrence of the brightness flicker between adjacent electrodes.

6. The system of claim 5, wherein
the controller removes the brightness flicker by adding one or more intermediate steps while moving the split barrier electrodes by controlling the split barrier electrodes for each independent electrode.

7. The system of claim 6, wherein
the controller sets the voltage applied to the split barrier electrodes at the intermediate step to a lower voltage than a voltage applied to the split barrier electrodes in a normal state.

8. The system of claim 5, wherein
the controller controls the numbers of split barrier electrodes supplied with one or more different voltages at an initial step and an intermediate step, and controls a movement completion step to be the same or different while the split barrier electrodes are moved.

9. A system for controlling brightness flicker of a parallax barrier LCD having a wide viewing angle, comprising:
    an image input section installed at a predetermined portion of a display panel to acquire a real-time image of a viewer;
    a controller recognizing the image of the viewer and extracting locations and coordinates of eyes of the viewer, and controlling all operations of a stereoscopic image display depending on a change of a viewing angle of the viewer; and
    split barrier electrodes turned on/off depending on the control by the controller to implement a stereoscopic image,
    wherein the controller determines a movement velocity when the change of the viewing angle of the viewer is detected, and controls movement of the split barrier electrodes by applying a set factor value only when the movement velocity is lower than a threshold velocity and does not move the split barrier electrodes when the movement velocity is equal to or higher than the threshold velocity.

10. A system for controlling brightness flicker of a parallax barrier LCD having a wide viewing angle, comprising:
    an image input section installed at a predetermined portion of a display panel to acquire a real-time image of a viewer;

a controller recognizing the image of the viewer and extracting locations and coordinates of eyes of the viewer, and controlling all operations of a stereoscopic image display depending on a change of a viewing angle of the viewer; and split barrier electrodes turned on/off depending on the control by the controller to implement a stereoscopic image, wherein the control unit controls on/off timings of the split barrier electrodes that are turned on and the split barrier electrodes that are turned off to be different from each other while split barriers are moved to adjust a permittivity characteristic.

11. The system of claim 10, wherein the controller controls the split barrier electrodes that are turned on to be actuated earlier than the split barrier electrodes that are turned off by a predetermined time to adjust a permittivity characteristic.

12. A method of controlling brightness flicker of a parallax barrier LCD having a wide viewing angle for controlling brightness of a display providing a stereoscopic image by acquiring a real-time image of a viewer, recognizing the image of the viewer and extracting locations and coordinates of eyes of the viewer, and controlling turn-on/off of split barrier electrodes, comprising at least one of:

adjusting a permittivity characteristic depending on turn-on of split barriers by applying a predetermined set voltage to the split barrier electrodes;

splitting and setting one or more curvature points on a permittivity curve by time while turning on/off the split barrier electrodes and supplying a voltage having a modulated phase to each curvature point;

controlling the split barrier electrodes for each independent electrode while split barriers are moved and supplying one or more different voltages to the independent electrodes;

controlling on/off timings of the split barrier electrodes that are turned on and the split barrier electrodes that are turned off to be different from each other while split barriers are moved; and controlling movement of the split barrier electrodes by applying a set factor value only when a changing velocity of a viewing angle of the viewer is lower than a threshold velocity and not moving the split barrier electrodes when the changing velocity is equal to or higher than the threshold velocity.

* * * * *